US010962081B2

(12) United States Patent
Sankaran et al.

(10) Patent No.: US 10,962,081 B2
(45) Date of Patent: Mar. 30, 2021

(54) DAMPER WITH DUAL SPRINGS

(71) Applicant: Tenneco Automotive Operating Company Inc., Lake Forest, IL (US)

(72) Inventors: Shivanand Sankaran, Canton, MI (US); Wojciech Weglorz, Chybie (PL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 16 days.

(21) Appl. No.: 16/571,474

(22) Filed: Sep. 16, 2019

(65) Prior Publication Data

US 2020/0011395 A1    Jan. 9, 2020

(51) Int. Cl.
| F16F 9/48 | (2006.01) |
| F16F 13/00 | (2006.01) |
| F16F 9/512 | (2006.01) |
| B60G 13/08 | (2006.01) |
| B60G 17/08 | (2006.01) |

(52) U.S. Cl.
CPC ............ *F16F 13/007* (2013.01); *B60G 13/08* (2013.01); *B60G 17/08* (2013.01); *F16F 9/48* (2013.01); *F16F 9/5126* (2013.01); *B60G 2202/24* (2013.01); *B60G 2202/30* (2013.01)

(58) Field of Classification Search
CPC ........ F16F 9/22; F16F 9/48; F16F 9/50; F16F 9/5126
USPC .............. 188/313, 314, 315, 322.15, 322.22; 267/224–226
See application file for complete search history.

(56) References Cited

U.S. PATENT DOCUMENTS

| 2,984,321 | A | 5/1961 | Schultze |
| 4,768,629 | A | 9/1988 | Wössner |
| 5,333,708 | A | 8/1994 | Jensen et al. |
| 6,814,193 | B2 | 11/2004 | Grundei |
| 8,066,105 | B2 | 11/2011 | Maniowski et al. |
| 9,091,320 | B1 | 7/2015 | Smith et al. |
| 9,546,707 | B2 | 1/2017 | Kus et al. |
| 9,964,171 | B2 | 5/2018 | Firek et al. |
| 10,167,921 | B2 | 1/2019 | Flacht et al. |
| 10,195,918 | B2 | 2/2019 | Watanabe |
| 2018/0355944 | A1 | 12/2018 | Veltum et al. |

FOREIGN PATENT DOCUMENTS

| DE | 102004030553 A1 | 2/2005 |
| DE | 102017201748 A1 | 8/2018 |
| JP | 2001227579 A | 8/2001 |
| JP | 2001241487 A | 9/2001 |
| JP | 6422714 B2 | 11/2018 |
| WO | 2014037661 A1 | 3/2014 |

*Primary Examiner* — Christopher P Schwartz
(74) *Attorney, Agent, or Firm* — McGarry Bair (57) ABSTRACT

A damper includes a pressure tube and a piston defining a rebound chamber and a compression chamber within the pressure tube. The damper further includes an adapter attached to the pressure tube. The damper includes a retainer slidably disposed within the pressure tube. The retainer and the adapter define an end chamber therebetween within the pressure tube. The damper also includes a cup movably disposed within the pressure tube between the retainer and the adapter. The damper further includes a tubular member disposed adjacent to the cup and attached to the adapter. The tubular member includes at least one through aperture. The damper includes a base valve attached to the adapter. The damper also includes a first spring disposed between the retainer and the cup and a second spring disposed between cup and the adapter.

20 Claims, 5 Drawing Sheets

DAMPER WITH DUAL SPRINGS

TECHNICAL FIELD

The present disclosure generally relates to dampers. More particularly, the present disclosure relates to a damper having dual springs.

BACKGROUND

Shock absorbers/dampers are generally installed on different types of equipment, such as vehicles, to damp vibrations during operation. For example, dampers are generally connected between a body and the suspension system of the vehicle in order to absorb the vibrations. Conventional dampers typically include a pressure tube, a reserve tube, a piston, a piston rod, and one or more valves. During a compression stroke and a rebound stroke of the damper, the piston may limit a flow of damping fluid between working chambers defined within a body of the damper due to which the damper produces a damping force for counteracting the vibrations. By further restricting the flow of damping fluid within the working chambers of the damper, greater damping forces may be generated by the damper.

Typically, a damper is provided with a hydraulic compression end stop (HCS) member. The HCS member is configured to operate during the compression stroke of the damper. In conventional HCS members, a secondary piston is attached to a primary piston though an extension rod. However, such an arrangement may increase an overall cost of the shock absorber.

SUMMARY

In an aspect of the present disclosure, a damper is provided. The damper includes a pressure tube defining a first end and a second end opposite to the first end. The damper also includes a piston slidably disposed within the pressure tube. The piston defines a rebound chamber and a compression chamber within the pressure tube. The damper further includes an adapter attached to the pressure tube at the second end. The damper includes a retainer slidably disposed within the pressure tube proximal to the second end. The retainer includes a retainer opening therethrough. The retainer and the adapter define an end chamber therebetween within the pressure tube. Further, the retainer opening fluidly communicates the end chamber with the compression chamber. The damper also includes a cup movably disposed within the pressure tube between the retainer and the adapter. The cup includes a cup opening therethrough. The cup opening fluidly communicates the cup with the end chamber. The damper further includes a tubular member disposed adjacent to the cup and attached to the adapter. The tubular member includes a first open end disposed in fluid communication with the cup, a second open end opposite to the first open end, and at least one through aperture disposed between the first open end and the second open end. The at least one through aperture is configured to fluidly communicate the tubular member with the end chamber. The damper further includes a base valve attached to the adapter and spaced apart from the second end of the pressure tube. The base valve is disposed in fluid communication with the second open end of the tubular member. The damper also includes a first spring disposed between the retainer and the cup. The damper further includes a second spring disposed between cup and the adapter. Upon engagement with the piston during a compression stroke, the retainer is configured to move the cup towards the second end of the pressure tube against biasing of the first spring and the second spring. Also, the cup is configured to at least partially cover the at least one through aperture of the tubular member during movement towards the second end of the pressure tube for at least partially restricting flow of fluid between the end chamber and the tubular member.

In another aspect of the present disclosure, a damper is provided. The damper includes a pressure tube defining a first end and a second end opposite to the first end. The damper also includes a piston slidably disposed within the pressure tube. The piston defines a rebound chamber and a compression chamber within the pressure tube. The damper further includes an adapter attached to the pressure tube at the second end. The damper includes a retainer slidably disposed within the pressure tube proximal to the second end. The retainer includes a retainer opening therethrough. The retainer and the adapter define an end chamber therebetween within the pressure tube. The retainer opening fluidly communicates the end chamber with the compression chamber. The damper also includes a cup movably disposed within the pressure tube between the retainer and the adapter. The cup includes a cup opening therethrough. The cup opening fluidly communicates the cup with the end chamber. The damper further includes a tubular member disposed adjacent to the cup and attached to the adapter. The tubular member includes a first open end disposed in fluid communication with the cup, a second open end opposite to the first open end, and at least one through aperture disposed between the first open end and the second open end. The at least one through aperture is configured to fluidly communicate the tubular member with the end chamber. The damper further includes a base valve attached to the adapter and spaced apart from the second end of the pressure tube. The base valve is disposed in fluid communication with the second open end of the tubular member. The damper also includes a first spring disposed between the retainer and the cup. The damper further includes a second spring disposed between cup and the adapter. The retainer opening and the cup opening at least partly define a first flow path of fluid between the compression chamber and the base valve. Further, the at least one through aperture at least partly defines a second flow path of fluid between the end chamber and the base valve. Additionally, upon engagement with the piston during compression stroke, the retainer is configured to move the cup towards the second end of the pressure tube against biasing of the first spring and the second spring. Furthermore, the cup is configured to at least partially cover the at least one through aperture of the tubular member during movement towards the second end of the pressure tube for at least partially blocking the second flow path of fluid between the end chamber and base valve.

In yet another aspect of the present disclosure, a damper is provided. The damper includes a pressure tube defining a first end and a second end opposite to the first end. The damper also includes a piston slidably disposed within the pressure tube. The piston defines a rebound chamber and a compression chamber within the pressure tube. The damper further includes an adapter attached to the pressure tube at the second end. The damper includes a retainer slidably disposed within the pressure tube proximal to the second end. The retainer includes a retainer opening therethrough. The retainer and the adapter define an end chamber therebetween within the pressure tube. The retainer opening fluidly communicates the end chamber with the compression chamber. The damper also includes a cup movably disposed within the pressure tube between the retainer and the adapter. The cup includes a cup opening therethrough and a cup flange configured to slidably engage with the tubular member. The cup opening fluidly communicates the cup with the end chamber. The damper further includes a tubular member disposed adjacent to the cup and attached to the adapter. The tubular member includes a first open end disposed in fluid communication with the cup, a second open end opposite to the first open end, and at least one through aperture disposed between the first open end and the second open end. The at least one through aperture is configured to fluidly communicate the tubular member with the end chamber. The damper further includes a base valve attached to the adapter and spaced apart from the second end of the pressure tube. The base valve is disposed in fluid communication with the second open end of the tubular member. The damper also includes a first spring disposed between the retainer and the cup. The damper further includes a second spring disposed between cup and the adapter. Upon engagement with the piston during a compression stroke, the retainer is configured to move the cup towards the second end of the pressure tube against biasing of the first spring and the second spring. Additionally, the cup is configured to at least partially cover the at least one through aperture of the tubular member during movement towards the second end of the pressure tube for at least partially restricting flow of fluid between the end chamber and the tubular member. The cup is further configured to fully cover the at least one through aperture when the cup flange is positioned between the at least one through aperture and the adapter during movement of the cup towards the second end of the pressure tube.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
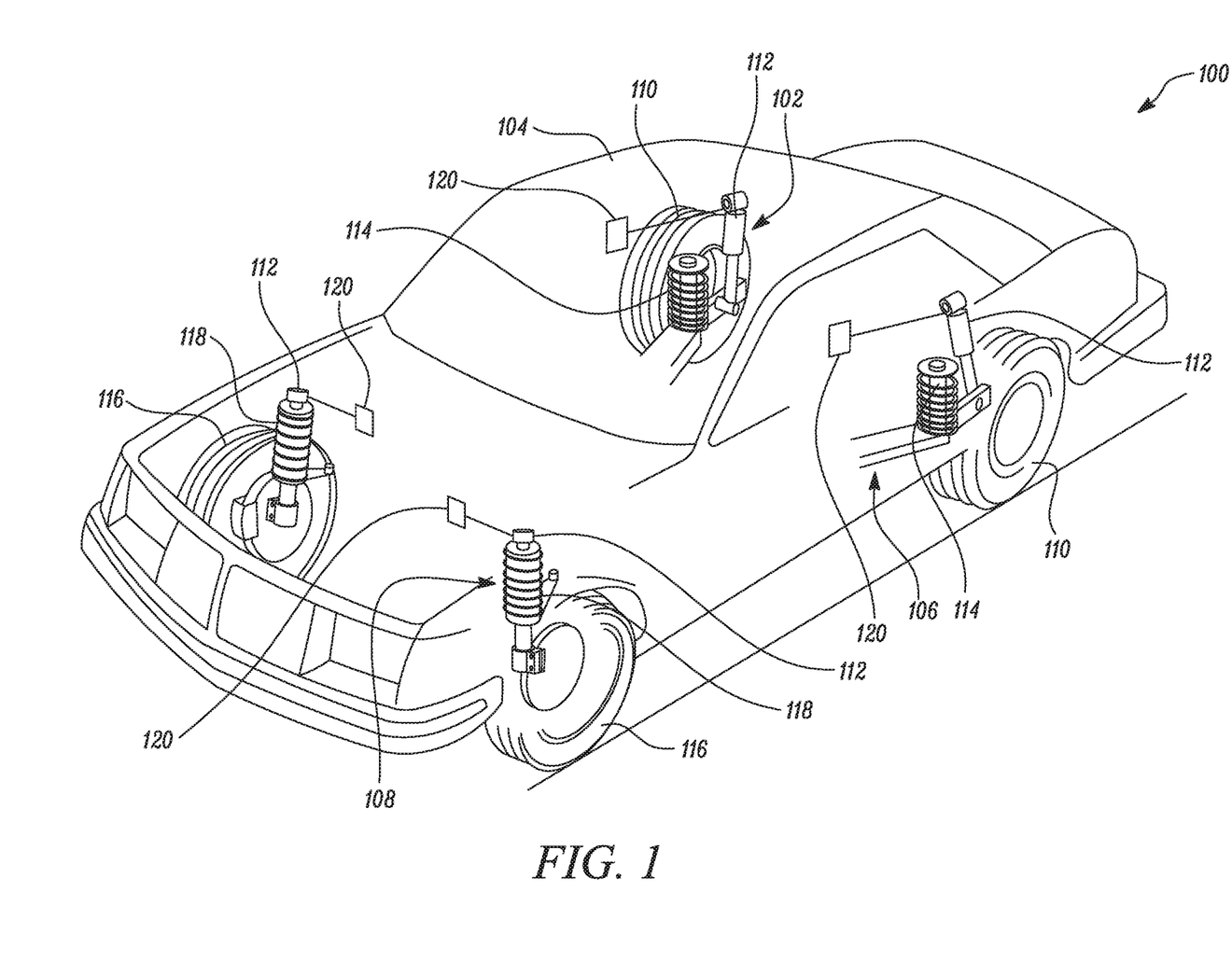
FIG. 1 is an illustration of a vehicle incorporating a suspension system, according to an aspect of the present disclosure.

FIG. 1 illustrates an exemplary vehicle 100 incorporating a suspension system 102 in accordance with the present disclosure. The vehicle 100 may include a vehicle driven by an internal combustion engine, an electric vehicle, or a hybrid vehicle. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) which operatively supports a pair of front wheels 116. The front axle assembly is operatively connected to the body 104 by means of another pair of the dampers 112 and a pair of helical coil springs 118. In an alternative embodiment, the vehicle 100 may include an independent suspension unit (not shown) for each of the four corners instead of front and rear axle assemblies.

The dampers 112 of the suspension system 102 serve to damp the relative movement of the unsprung portion (i.e., the front and rear suspensions 108, 106) and the sprung portion (i.e., the body 104) of the vehicle 100. While the vehicle 100 has been depicted as a passenger car, the dampers 112 may be used with other types of vehicles or any equipment that requires damping. Examples of vehicles include buses, trucks, off-road vehicles, and so forth. Furthermore, the term "damper 112" as used herein will refer to dampers in general and will include shock absorbers, McPherson struts, and semi-active and active suspensions.

In order to automatically adjust each of the dampers 112, an electronic controller 120 is electrically connected to the dampers 112. The controller 120 is used for controlling an operation of each of the dampers 112 in order to provide appropriate damping characteristics resulting from movements of the body 104 of the vehicle 100. Further, the controller 120 may independently control each of the dampers 112 in order to independently regulate a damping level of each of the dampers 112. The controller 120 may be electrically connected to the dampers 112 via wired connections, wireless connections, or a combination thereof. In examples, each of the dampers 112 may include a dedicated electronic controller 120 that may be located onboard the respective damper 112. Further, the functionalities of the controller 120 may be performed by an Electronic Control Unit (ECU) of the vehicle 100.

The controller 120 may independently adjust the damping level or characteristic of each of the dampers 112 to optimize a riding performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Such adjustments of the damping levels may be beneficial during braking and turning of the vehicle 100. The controller 120 may include a processor, a memory, Input/Output (I/O) interfaces, communication interfaces, and other components. The processor may execute various instructions stored in the memory for carrying out various operations of the controller 120. The controller 120 may receive and transmit signals and data through the I/O interfaces and the communication interfaces. In further embodiments, the controller 120 may include microcontrollers, application-specific integrated circuits (ASICs), field programmable gate arrays (FPGAs), and so forth.

Figure 2:
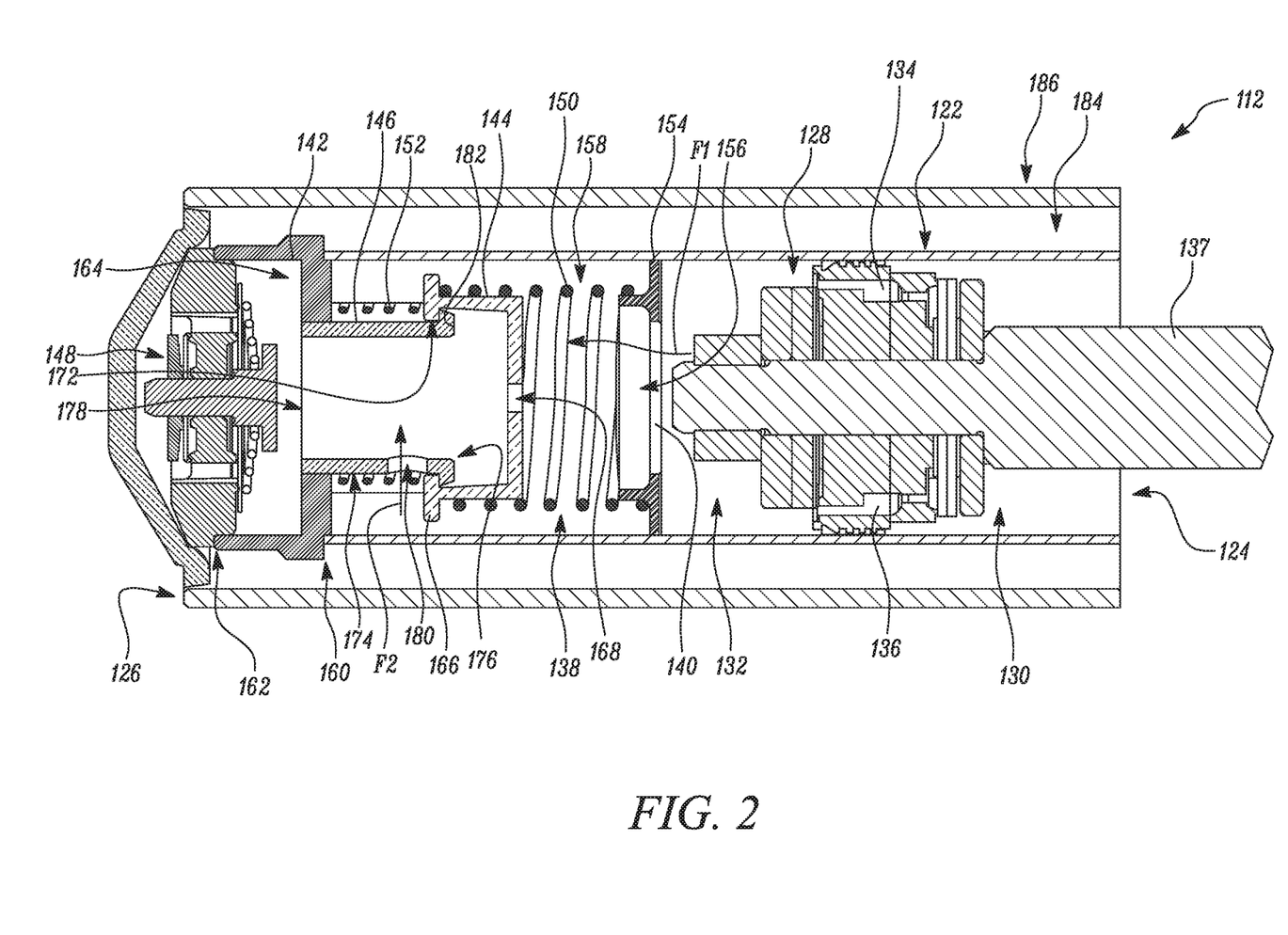
FIG. 2 is a schematic illustration of a damper associated with the suspension system of FIG. 1, according to an aspect of the present disclosure.

FIG. 2 illustrates a schematic view of the damper 112. The damper 112 may be any of the four dampers 112 of the vehicle 100. The damper 112 may include a Continuously Variable Semi-Active Suspension system (CVSA) damper 112 or a shock absorber, without any limitations. The damper 112 may contain a fluid which can be a hydraulic fluid or oil. The damper 112 includes a pressure tube 122 defining a first end 124 and a second end 126 opposite to the first end 124. The pressure tube 122 is embodied as a monolithic pressure tube. The pressure tube 122 may be further embodied as a substantially cylindrical tube with open ends.

A piston 128 is slidably disposed within the pressure tube 122. The piston 128 defines a rebound chamber 130 and a compression chamber 132 within the pressure tube 122. The rebound chamber 130 is proximal to the first end 124, while the compression chamber 132 is distal to the first end 124. Each of the rebound and compression chambers 130, 132 contain the fluid therein. A volume of each of the rebound and compression chambers 130, 132 varies based on a reciprocating motion of the piston 128. Additionally, a pair of piston valves 134, 136 may be disposed within the piston 128 to regulate fluid flow between the rebound and compression chambers 130, 132. More particularly, the piston valves 134, 136 may maintain desired pressures in each of the rebound and compression chambers 130, 132. In an embodiment, the piston valve 134 operates in an open position during a rebound stroke and is in a closed position during a compression stroke. During the rebound stroke, the piston 128 moves towards the first end 124. During the compression stroke, the piston 128 moves towards the second end 126. Further, the piston valve 136 operates in an open position during the compression stroke and is in a closed position during the rebound stroke.

In an example, the piston valves 134, 136 may be embodied as unidirectional valves, such as non-return valves. The piston valves 134, 136 may therefore include check valves. Alternatively, the piston valves 134, 136 may include variable flow control valves, without any limitations. Further, the piston 128 is connected to the body 104 of the vehicle 100 by a rod member 137, a portion of which is received within the rebound chamber 130.

The damper 112 includes a dual stage hydraulic compression end stop (HCS) unit 138. The HCS unit 138 includes a retainer 140, an adapter 142, a cup 144, a tubular member 146, a base valve 148, a first spring 150, and a second spring 152. More particularly, the damper 112 includes the retainer 140. The retainer 140 is slidably disposed within the pressure tube 122 proximal to the second end 126. The retainer 140 further includes a retainer flange 154 configured to slidably engage with the pressure tube 122. The retainer 140 includes a retainer opening 156 therethrough. The retainer 140 and the adapter 142 define an end chamber 158 therebetween within the pressure tube 122. Further, the retainer opening 156 fluidly communicates the end chamber 158 with the compression chamber 132.

The damper 112 includes the adapter 142. The adapter 142 is attached to the pressure tube 122 at the second end 126. The adapter 142 includes an upper part 160 attached to the tubular member 146. The upper part 160 includes an open end that receives a portion of the tubular member 146. The adapter 142 includes a lower part 162 extending from the upper part 160 and attached to the base valve 148. The lower part 162 also includes an open end that receives the base valve 148. Further, an adapter chamber 164 is defined between the adapter 142 and the base valve 148. The adapter 142 may be press fitted or welded to the tubular member 146.

The damper 112 includes the cup 144. The cup 144 includes a generally C-shaped cross-section. The cup 144 is movably disposed within the pressure tube 122 between the retainer 140 and the adapter 142. The cup 144 includes a cup flange 166 configured to slidably engage with the tubular member 146. Further, the cup 144 includes a cup opening 168 therethrough. The cup opening 168 fluidly communicates the cup 144 with the end chamber 158. More particularly, the retainer opening 156 and the cup opening 168 at least partly define a first flow path of fluid "F1" between the compression chamber 132 and the base valve 148. The cup flange 166 defines a through opening (not shown). The through opening of the cup flange 166 at least partly receives the tubular member 146. Specifically, an inner surface 172 of the cup flange 166 defines the through opening. Further, the inner surface 172 contacts an outer surface 174 of the tubular member 146 when the cup 144 moves within the pressure tube 122.

The damper 112 includes the tubular member 146. The tubular member 146 includes a first open end 176 disposed in fluid communication with the cup 144, a second open end 178 opposite to the first open end 176, and at least one through aperture 180 disposed between the first open end 176 and the second open end 178. The tubular member 146 is disposed adjacent to the cup 144 and attached to the adapter 142. The tubular member 146 further includes a tube flange 182 disposed at the first open end 176. The tube flange 182 is configured to releasably engage with the cup flange 166 to retain the cup 144 at a rest position when the piston 128 is disengaged from the retainer 140. The rest position of the cup 144 is defined as a position of the cup 144 when the piston 128 is disengaged or spaced apart from the retainer 140. The second spring 152 may bias the tube flange 182 against the cup flange 166 in the rest position. Further, the first spring 150 may bias the retainer 140 away from the cup 144. The retainer 140 is therefore spaced apart from the cup 144 in the rest position.

The at least one through aperture 180 is configured to fluidly communicate the tubular member 146 with the end chamber 158. Further, the at least one through aperture 180 is in fluid communication with the end chamber 158 when the cup 144 is at the rest position. More particularly, when the piston 128 is spaced apart from the retainer 140, the at least one through aperture 180 provides fluid communication between the tubular member 146 and the end chamber 158. The at least one through aperture 180 at least partly defines a second flow path of fluid "F2" between the end chamber 158 and the base valve 148. During the compression stroke of the piston 128, fluid can flow through both the first and second flow paths of fluid "F1", "F2" as long as the piston 128 is spaced apart from the retainer 140.

Figure 3:
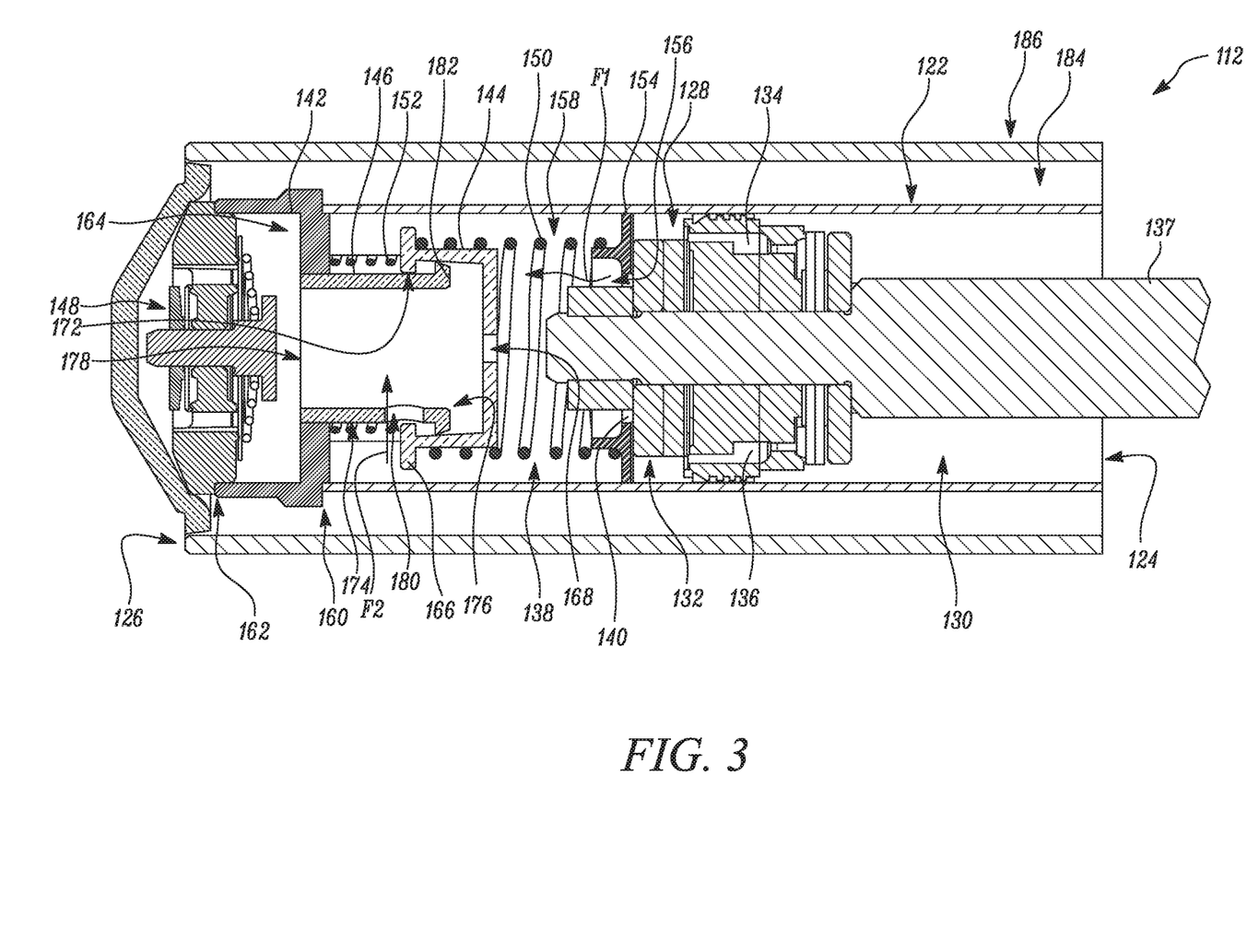
FIG. 3 is an illustration of the damper shown in FIG. 2 when a through aperture of the tubular member is partially blocked.

As shown in FIG. 3, upon engagement with the piston 128 during the compression stroke, the cup 144 is configured to at least partially cover the at least one through aperture 180 of the tubular member 146 during movement towards the second end 126 of the pressure tube 122 for at least partially blocking the second flow path of fluid "F2" between the end chamber 158 and the base valve 148. Specifically, the piston 128 may move the retainer 140 towards the second end 126 against the biasing of the first spring 150. Due to movement of the retainer 140, the cup 144 may also move towards the second end 126 against the biasing of the second spring 152. Thus, the cup 144 at least partially covers the through aperture 180 of the tubular member 146 during movement towards the second end 126 of the pressure tube 122 for partially restricting the flow of fluid between the end chamber 158 and the tubular member 146.

Figure 4:
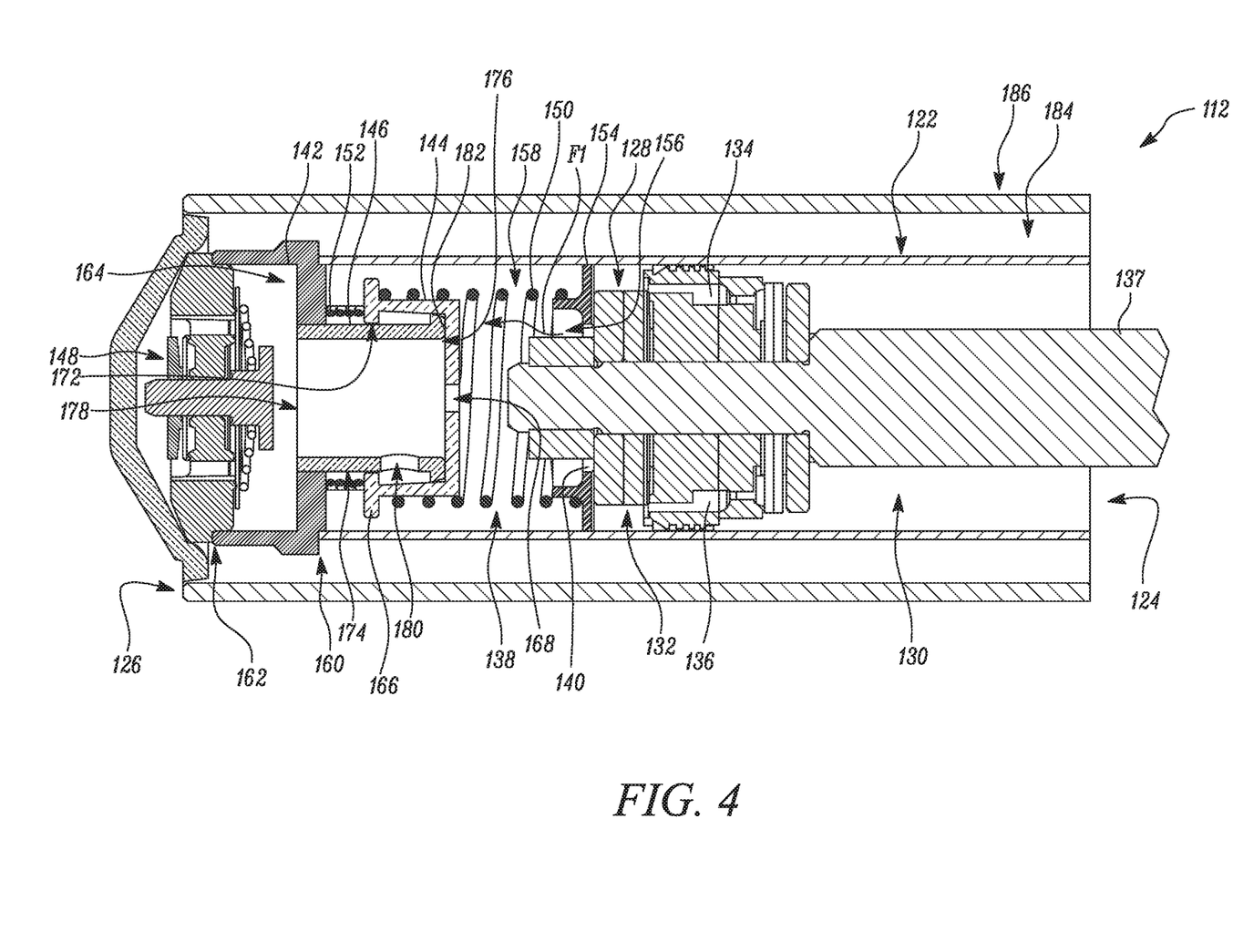
FIG. 4 is an illustration of the damper shown in FIG. 2 when the through aperture of the tubular member is completely blocked.

Referring now to FIG. 4, during the compression stroke, the at least one through aperture 180 may be blocked in order to prevent fluid communication between the tubular member 146 and the end chamber 158. More particularly, the cup 144 is configured to fully cover the at least one through aperture 180 when the cup flange 166 is positioned between the at least one through aperture 180 and the adapter 142 during movement of the cup 144 towards the second end 126 of the pressure tube 122.

In various examples, the at least one through aperture 180 includes a plurality of through apertures angularly spaced apart from each other on the tubular member 146. The multiple through apertures may be radially and/or axially spaced apart from each other. Further, the through aperture 180 may include any shape, such as, circular or elliptical. Additionally, one or more of the through apertures 180 may cover a part of an overall length of the tubular member 146. For example, one or more of the through apertures 180 may cover at least half or less than half of the overall length of the tubular member 146. In other examples, one or more of the through apertures 180 may cover a part of an overall circumference of the tubular member 146. For example, one or more of the through apertures 180 may cover at least half or less than half of the overall circumference of the tubular member 146.

Further, the damper 112 includes the base valve 148. The base valve 148 is attached to the adapter 142 and spaced apart from the second end 126 of the pressure tube 122. The base valve 148 may be press-fitted or welded to the adapter 142. The base valve 148 is disposed in fluid communication with the second open end 178 of the tubular member 146. The base valve 148 may close the open end defined at the lower part 162 of the adapter 142. The base valve 148 may operate in an open position during the compression stroke and may be in a closed position during the rebound stroke.

In the open position, the base valve 148 allows fluid flow from the adapter chamber 164 towards a reserve chamber 184. In another example, the damper 112 may include an additional base valve disposed to regulate fluid flow between the adapter chamber 164 and the reserve chamber 184 during the rebound stroke. For example, the base valve 148 may include an assembly of valves. More particularly, the base valve 148 may include a pair of unidirectional valves, such as non-return valves, that are operational during the rebound stroke and the compression stroke, respectively. The base valve 148 may therefore include a pair of check valves. Further, the base valve 148 may include a pair of variable flow control valves that are operational during the rebound stroke and the compression stroke, respectively.

In some embodiments, one or more of the piston valves 134, 136 and the base valve 148 may be embodied as electro-hydraulic valves. In one example, at least one of the piston valves 134, 136 and the base valve 148 may be a continuously variable solenoid valve. Further, at least one of the piston valves 134, 136 and the base valve 148 may be electronically controlled by the controller 120 such that the controller 120 (shown in FIG. 1) may regulate the piston valves 134, 136 and the base valve 148 in order to control the damping level of the damper 112.

The damper 112 further includes the first spring 150. The first spring 150 is disposed between the retainer 140 and the cup 144. More particularly, the first spring 150 is disposed between the retainer flange 154 and the cup flange 166. The first spring 150 surrounds at least a portion of the cup 144. Respective ends of the first spring 150 may be connected to the retainer flange 154 and the cup flange 166. In the illustrated embodiment, the first spring 150 is embodied as a helical spring. A pitch, a diameter, and a stiffness of the first spring 150 may be varied based on application requirements. Further, the damper 112 includes the second spring 152. The second spring 152 is disposed between the cup 144 and the adapter 142. In the illustrated embodiment, the second spring 152 is disposed outside the tubular member 146. The second spring 152 surrounds a portion of the tubular member 146. In an alternate embodiment, the second spring 152 may be at least partially received within the tubular member 146 (shown in FIG. 5).

In the illustrated embodiment, the second spring 152 is embodied as a helical spring. A pitch, a diameter, and a stiffness of the first spring 150 may be varied based on application requirements. In some embodiments, the stiffness of the first spring 150 is different from the stiffness of the second spring 152. Respective ends of the second spring 152 may be connected to the cup flange 166 and the adapter 142. In an embodiment, the first spring 150 is stiffer than the second spring 152. The stiffness of the first and second springs 150, 152 may be varied as per requirements. Upon engagement with the piston 128 during the compression stroke, the retainer 140 is configured to move the cup 144 towards the second end 126 of the pressure tube 122 against biasing of the first spring 150 and the second spring 152. In some embodiments, at least one of the first and second springs 150, 152 is a linear spring. In some embodiments, at least one of the first and second springs 150, 152 is a non-linear spring.

The damper 112 also includes a reserve tube 186 disposed around the pressure tube 122. In some embodiments, the reserve tube 186 is concentrically disposed around the pressure tube 122. The reserve tube 186 defines the reserve chamber 184. The reserve chamber 184 is disposed between the pressure tube 122 and the reserve tube 186. The reserve chamber 184 may be in fluid communication with an external fluid reservoir (not shown), such as an accumulator. Further, the damper 112 may include a valve assembly (not shown) that provides fluid communication between the reserve chamber 184 and the external fluid reservoir. In such examples, the valve assembly may regulate a flow of fluid between the reserve chamber 184 and the external fluid reservoir. The valve assembly may be electronically controlled by the controller 120.

As shown in FIG. 2, the piston 128 is spaced apart from the retainer 140. It should be noted that the cup 144 is at the rest position when the piston 128 is disengaged from the retainer 140. Further, the through aperture 180 allows fluid communication between the end chamber 158 and the tubular member 146. As the piston 128 travels towards the first end 124 during the rebound stroke, the volume of the compression chamber 132 increases and the volume of the rebound chamber 130 decreases. As the volume of the rebound chamber 130 decreases, a small portion of the fluid in the rebound chamber 130 may flow from the rebound chamber 130 towards the compression chamber 132, via the piston valve 134. The piston valve 134 may be in the open position during the rebound stroke of the damper 112 to further control rebound damping characteristics of the damper 112. In some examples, a degree of opening of the piston valve 134 and the base valve 148 may be regulated to adjust the rebound damping characteristics of the damper 112. Further, during the rebound stroke, the piston valve 136 may be operable to prevent fluid flow therethrough in response to the motion of the piston 128 towards the first end 124. More particularly, the piston valve 136 is in the closed position during the rebound stroke of the damper 112.

Further, an additional flow of fluid is directed to the compression chamber 132 to compensate for the increase in the volume of the compression chamber 132. More particularly, the compression chamber 132 may receive a portion of fluid from the reserve chamber 184 through the base valve 148. For example, fluid from the reserve chamber 184 may flow towards the adapter chamber 164, via the base valve 148. The fluid may then flow towards the end chamber 158, via the through aperture 180. A portion of this fluid may be further directed towards the compression chamber 132, via the retainer opening 156.

During the compression stroke, when the piston 128 travels towards the second end 126, the volume of the rebound chamber 130 increases, whereas the volume of the compression chamber 132 decreases. Thus, fluid from the compression chamber 132 flows towards the end chamber 158, via the first flow path of fluid "F1". Specifically, fluid flows through the retainer opening 156, the cup opening 168, and the tubular member 146 to the adapter chamber 164 and the base valve 148. Further, the through aperture 180 allows fluid flow from the end chamber 158 towards the base valve 148, via the second flow path of fluid "F2". Fluid flows towards the reserve chamber 184, via the base valve 148. Therefore, as long as the piston 128 is spaced apart from the retainer 140 during the compression stroke, both the first flow path of fluid "F1" and the second flow path of fluid "F2" allow fluid flow between the compression chamber 132 and the base valve 148.

Referring to FIG. 3, as the compression stroke advances and the piston 128 moves towards the second end 126, the piston 128 engages with the retainer 140 and pushes the retainer 140 towards the second end 126. Thus, the retainer 140 travels towards the second end 126 against the biasing of the first spring 150 and the second spring 152. It should be noted that the movement of the retainer 140 compresses the first and second springs 150, 152. Further, such movement of the retainer 140 causes the cup 144 to move towards the second end 126 of the pressure tube 122 against the biasing of the second spring 152. As the cup 144 moves towards the second end 126, the cup 144 partially covers the through aperture 180 thereby partially blocking the fluid flow from the end chamber 158 towards the base valve 148.

Referring to FIG. 4, further movement of the cup 144 towards the second end 126 causes the cup 144 to fully cover the through aperture 180. More particularly, when the cup flange 166 is positioned between the through aperture 180 and the adapter 142 during movement of the cup 144 towards the second end 126 of the pressure tube 122, the cup 144 fully covers the through aperture 180 thereby blocking the fluid flow between the end chamber 158 and the tubular member 146. Such gradual restriction of fluid flow may gradually increase resistance to fluid flow thereby allowing smoother damping performance during the compression stroke. The dual spring design may provide a soft entry region of the piston 128 in the HCS unit 138, thereby enabling smoother operation of the damper 112 during the compression stroke. Additionally, it should be noted that varying the stiffness of the first and second springs 150, 152 may allow control of the rate at which the through aperture 180 is covered partially or fully, thereby allowing controlling a rate at which HCS damping force increases with advancement of the compression stroke.

Further, to compensate for the increase in the volume of the rebound chamber 130, a small portion of the fluid from the compression chamber 132 may enter into the rebound chamber 130, via the piston valve 136, to regulate pressure in the rebound chamber 130. In some examples, a degree of opening of the piston valve 136 may be regulated to further adjust the compression damping characteristics of the damper 112.

Figure 5:
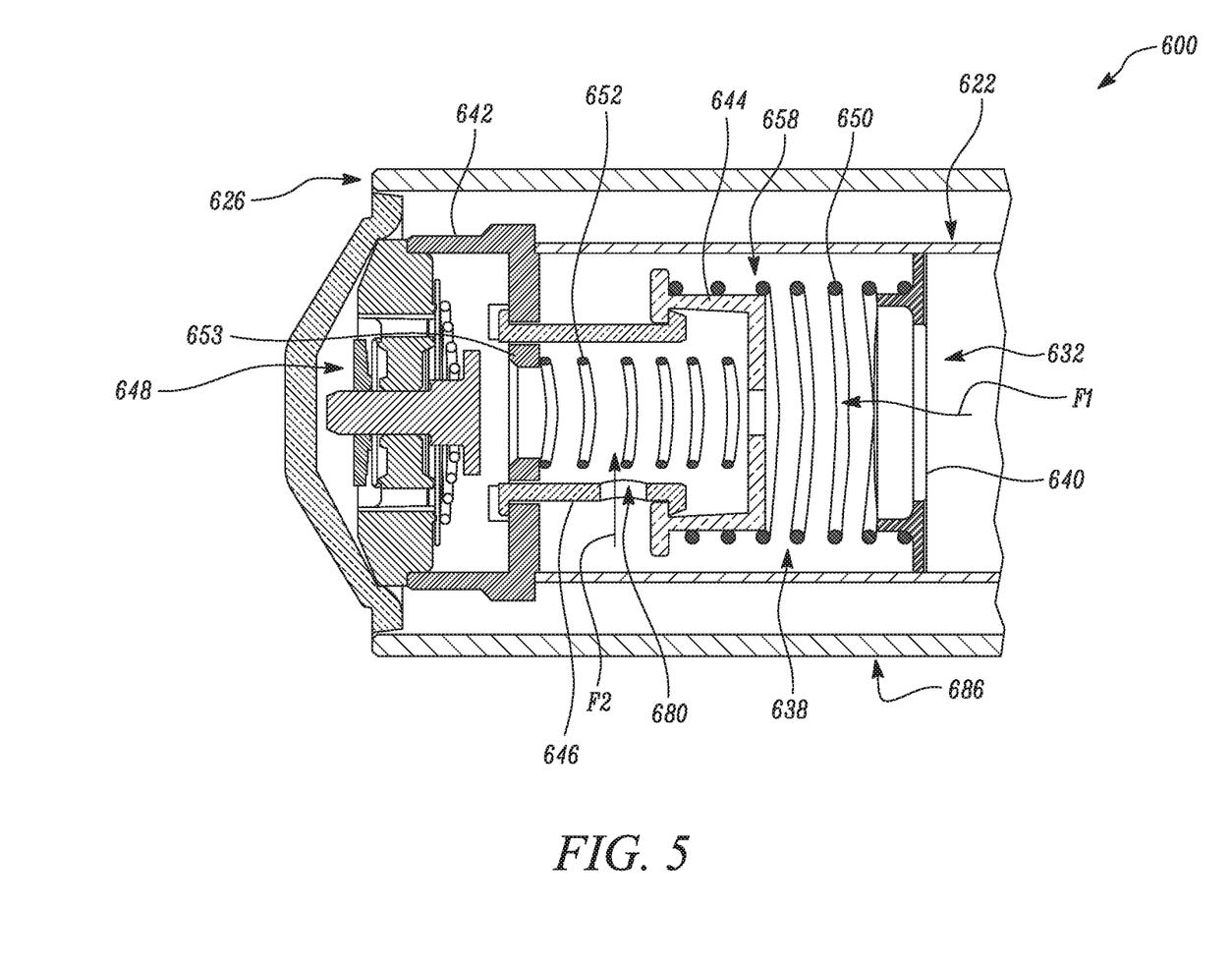
FIG. 5 is a schematic illustration of yet another design of a damper depicting fluid flow during a compression stroke of the damper, according to an aspect of the present disclosure.

FIG. 5 illustrates another design of a damper 600. Components and working of the damper 600 are substantially similar to components and working of the damper 112 described with reference to FIGS. 2 to 4. The damper 600 includes the pressure tube 622 and a reserve tube 686 similar to the pressure tube 622 and the reserve tube 186, respectively, of the damper 112. The damper 600 includes a piston (not shown), a rebound chamber (not shown), and a compression chamber 632 similar to the piston 128, the rebound chamber 130, and the compression chamber 132, respectively, of the damper 112. Further, the damper 600 includes an HCS unit 638 similar to the HCS unit 138 described with reference to FIGS. 2 to 4. The HCS unit 638 of the damper 600 includes a retainer 640, a cup 644, a tubular member 646, a base valve 648, and a first spring 650 similar to the retainer 140, the cup 144, the tubular member 146, the base valve 148, and the first spring 150, respectively, of the damper 112. Further, an adapter 642 of the damper 600 may be substantially similar to the adapter 142 of the damper 112. However, the adapter 642 may have an extending portion 653 that extends radially inwards within the tubular member 146. The extending portion 653 may support a second spring 652.

The damper 600 also includes the second spring 652. The second spring 652 is disposed between the cup 644 and the adapter 642. In the illustrated embodiment, the second spring 652 is at least partially received within the tubular member 646. More particularly, a portion of the second spring 652 is received within the tubular member 646, whereas a portion of the second spring 652 is received within the cup 644. The second spring is concentrically disposed within the cup 644 and the tubular member 646. Respective ends of the second spring 652 may be connected to the cup 644 and the adapter 642. In the illustrated embodiment, the second spring 652 is embodied as a helical spring. A pitch, a diameter, and a stiffness of the first spring 650 may be varied based on application requirements. Further, the stiffness of the first spring 650 may be different from the stiffness of the second spring 652.

Upon engagement with the piston during a compression stroke of the damper 600, the retainer 640 is configured to move the cup 644 towards a second end 626 of the pressure tube 622 against biasing of the first spring 650 and the second spring 652. Further, the cup 644 is configured to at least partially cover at least one through aperture 680 of the tubular member 646 during movement towards the second end 626 of the pressure tube 622 for at least partially restricting flow of fluid between an end chamber 658 and the tubular member 646. Additionally, the cup 644 is configured to fully cover the at least one through aperture 680 of the tubular member 646 during movement towards the second end 626 of the pressure tube 622 for blocking the flow of fluid between the end chamber 658 and the tubular member 646. The end chamber 658 is similar to the end chamber 158. It should be noted that a working of the damper 600 during rebound and compression strokes is similar to the working of the damper 112 during the rebound and compression strokes.

The dampers 112, 600 described in this disclosure may reduce a dead length that is typically added due to inclusion of the respective HCS units 138, 638. The dead length may refer to a length of the pressure tube 122, 622 corresponding to which there is no piston stroke or movement. In particular, compression of the first spring 150, 650 and the second spring 152, 652 may reduce the dead length. The components of the HCS units 138, 638 may be assembled offline as a subsystem and brought in line with minimal tooling changes. Further, the dampers 112, 600 described above may provide improved damping and may include cost effective and fewer components as compared to conventional dampers including HCS cups. Additionally, the concept may be executed without making any substantial changes to a head assembly of the damper 112, 600. Further, the dampers 112, 600 may eliminate the requirement of a separate HCS cup and may also provide improved stroke flexibility of the piston 128. Additionally, the retainer 140 may control an extent of travel of the piston 128 while providing additional damping.

The design of the HCS units 138, 638 associated with the dampers 112, 600 explained above may include simplified construction and is easy to manufacture. Further, the HCS units 138, 638 described above may be incorporated in the dampers at a lower cost as compared to existing HCS units. Additionally, an application of the dampers 112, 600 described herein is not restricted to vehicles and may be used in any application that incorporates a damper.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A damper comprising:
    a pressure tube defining a first end and a second end opposite to the first end;
    a piston slidably disposed within the pressure tube, the piston defining a rebound chamber and a compression chamber within the pressure tube;
    an adapter attached to the pressure tube at the second end;
    a retainer slidably disposed within the pressure tube proximal to the second end, the retainer comprising a retainer opening therethrough, wherein the retainer and the adapter define an end chamber therebetween within the pressure tube, and wherein the retainer opening fluidly communicates the end chamber with the compression chamber;
    a cup movably disposed within the pressure tube between the retainer and the adapter, the cup comprising a cup opening therethrough, wherein the cup opening fluidly communicates the cup with the end chamber;
    a tubular member disposed adjacent to the cup and attached to the adapter, the tubular member comprising a first open end disposed in fluid communication with the cup, a second open end opposite to the first open end, and at least one through aperture disposed between the first open end and the second open end, wherein the at least one through aperture is configured to fluidly communicate the tubular member with the end chamber;
    a base valve attached to the adapter and spaced apart from the second end of the pressure tube, wherein the base valve is disposed in fluid communication with the second open end of the tubular member;
    a first spring disposed between the retainer and the cup; and
    a second spring disposed between cup and the adapter;
    wherein, upon engagement with the piston during a compression stroke, the retainer is configured to move the cup towards the second end of the pressure tube against biasing of the first spring and the second spring, and wherein the cup is configured to at least partially cover the at least one through aperture of the tubular member during movement towards the second end of the pressure tube for at least partially restricting flow of fluid between the end chamber and the tubular member.

2. The damper of claim 1, wherein the adapter comprises:
    an upper part attached to the tubular member; and
    a lower part extending from the upper part and attached to the base valve.

3. The damper of claim 1, wherein the second spring is disposed outside the tubular member.

4. The damper of claim 1, wherein the second spring is at least partially received within the tubular member.

5. The damper of claim 1, wherein a stiffness of the first spring is different from a stiffness of the second spring.

6. The damper of claim 1, wherein the at least one through aperture comprises a plurality of through apertures angularly spaced apart from each other on the tubular member.

7. The damper of claim 1, wherein the cup further comprises a cup flange configured to slidably engage with the tubular member.

8. The damper of claim 7, wherein the cup is further configured to fully cover the at least one through aperture when the cup flange is positioned between the at least one through aperture and the adapter during movement of the cup towards the second end of the pressure tube.

9. The damper of claim 8, wherein the tubular member further comprises a tube flange disposed at the first open end, wherein the tube flange is configured to releasably engage with the cup flange to retain the cup at a rest position when the piston is disengaged from the retainer, and wherein the at least one through aperture is in fluid communication with the end chamber when the cup is in the rest position.

10. The damper of claim 7, wherein the retainer further comprises a retainer flange configured to slidably engage with the pressure tube.

11. The damper of claim 10, wherein the first spring is disposed between the retainer flange and the cup flange.

12. The damper of claim 1, further comprising a reserve tube disposed around the pressure tube.

13. A damper comprising:
    a pressure tube defining a first end and a second end opposite to the first end;
    a piston slidably disposed within the pressure tube, the piston defining a rebound chamber and a compression chamber within the pressure tube;
    an adapter attached to the pressure tube at the second end;
    a retainer slidably disposed within the pressure tube proximal to the second end, the retainer comprising a retainer opening therethrough, wherein the retainer and the adapter define an end chamber therebetween within the pressure tube, and wherein the retainer opening fluidly communicates the end chamber with the compression chamber;
    a cup movably disposed within the pressure tube between the retainer and the adapter, the cup comprising a cup opening therethrough, wherein the cup opening fluidly communicates the cup with the end chamber;
    a tubular member disposed adjacent to the cup and attached to the adapter, the tubular member comprising a first open end disposed in fluid communication with the cup, a second open end opposite to the first open end, and at least one through aperture disposed between the first open end and the second open end, wherein the at least one through aperture is configured to fluidly communicate the tubular member with the end chamber;
    a base valve attached to the adapter and spaced apart from the second end of the pressure tube, wherein the base valve is disposed in fluid communication with the second open end of the tubular member;

a first spring disposed between the retainer and the cup; and a second spring disposed between cup and the adapter;

wherein the retainer opening and the cup opening at least partly define a first flow path of fluid between the compression chamber and the base valve, wherein the at least one through aperture at least partly defines a second flow path of fluid between the end chamber and the base valve, wherein, upon engagement with the piston during a compression stroke, the retainer is configured to move the cup towards the second end of the pressure tube against biasing of the first spring and the second spring, and wherein the cup is configured to at least partially cover the at least one through aperture of the tubular member during movement towards the second end of the pressure tube for at least partially blocking the second flow path of fluid between the end chamber and base valve.

14. The damper of claim 13, wherein the second spring is disposed outside the tubular member.

15. The damper of claim 13, wherein the second spring is at least partially received within the tubular member.

16. The damper of claim 13, wherein the cup further comprises a cup flange configured to slidably engage with the tubular member.

17. The damper of claim 16, wherein the cup is further configured to fully cover the at least one through aperture for fully blocking the second flow path of fluid when the cup flange is positioned between the at least one through aperture and the adapter during movement of the cup towards the second end of the pressure tube.

18. The damper of claim 17, wherein the tubular member further comprises a tube flange disposed at the first open end, wherein the tube flange is configured to releasably engage with the cup flange to retain the cup at a rest position when the piston is disengaged from the retainer, and wherein the at least one through aperture is in fluid communication with the end chamber when the cup is in the rest position.

19. A damper comprising:

a pressure tube defining a first end and a second end opposite to the first end;

a piston slidably disposed within the pressure tube, the piston defining a rebound chamber and a compression chamber within the pressure tube;

an adapter attached to the pressure tube at the second end;

a retainer slidably disposed within the pressure tube proximal to the second end, the retainer comprising a retainer opening therethrough, wherein the retainer and the adapter define an end chamber therebetween within the pressure tube, and wherein the retainer opening fluidly communicates the end chamber with the compression chamber;

a cup movably disposed within the pressure tube between the retainer and the adapter, the cup comprising a cup opening therethrough, wherein the cup opening fluidly communicates the cup with the end chamber;

a tubular member disposed adjacent to the cup and attached to the adapter, the tubular member comprising a first open end disposed in fluid communication with the cup, a second open end opposite to the first open end, and at least one through aperture disposed between the first open end and the second open end, wherein the at least one through aperture is configured to fluidly communicate the tubular member with the end chamber;

a base valve attached to the adapter and spaced apart from the second end of the pressure tube, wherein the base valve is disposed in fluid communication with the second open end of the tubular member;

a first spring disposed between the retainer and the cup; and a second spring disposed between cup and the adapter;

wherein, upon engagement with the piston during a compression stroke, the retainer is configured to move the cup towards the second end of the pressure tube against biasing of the first spring and the second spring, wherein the cup is configured to at least partially cover the at least one through aperture of the tubular member during movement towards the second end of the pressure tube for at least partially restricting flow of fluid between the end chamber and the tubular member, and wherein the cup is further configured to fully cover the at least one through aperture when the cup flange is positioned between the at least one through aperture and the adapter during movement of the cup towards the second end of the pressure tube.

20. The damper of claim 19, wherein the tubular member further comprises a tube flange disposed at the first open end, wherein the tube flange is configured to releasably engage with the cup flange to retain the cup at a rest position when the piston is disengaged from the retainer, and wherein the at least one through aperture is in fluid communication with the end chamber when the cup is in the rest position.

* * * * *